United States Patent
Olson et al.

(10) Patent No.: US 8,557,178 B2
(45) Date of Patent: Oct. 15, 2013

(54) CORROSION INHIBITION OF HYPOCHLORITE SOLUTIONS IN SATURATED WIPES

(75) Inventors: Erik C. Olson, Savage, MN (US); Kim R. Smith, Woodbury, MN (US); Steven E. Lentsch, St. Paul, MN (US); Sherri L. Tischler, Inver Grove Heights, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 13/548,367

(22) Filed: Jul. 13, 2012

(65) Prior Publication Data
US 2012/0273374 A1    Nov. 1, 2012

Related U.S. Application Data

(60) Continuation-in-part of application No. 13/292,598, filed on Nov. 9, 2011, now Pat. No. 8,343,380, which is a division of application No. 12/974,520, filed on Dec. 21, 2010, now Pat. No. 8,114,344.

(51) Int. Cl.
| | |
|---|---|
| *C23F 11/12* | (2006.01) |
| *C23F 11/173* | (2006.01) |
| *C23F 11/18* | (2006.01) |
| *C23F 11/06* | (2006.01) |
| *C01B 11/06* | (2006.01) |
| *B08B 1/00* | (2006.01) |
| *B65D 71/00* | (2006.01) |
| *B23B 27/04* | (2006.01) |

(52) U.S. Cl.
USPC ............... 422/7; 252/398.61; 252/389.62; 252/396; 252/400.61; 252/400.62; 252/407; 252/187.24; 252/187.25; 252/187.27; 252/187.28; 252/187.3; 252/187.26; 252/187.29; 205/466; 205/556; 205/746; 205/756; 205/563; 205/265

(58) Field of Classification Search
USPC ............... 422/7; 252/389.52, 389.61, 389.62, 252/396, 400.52, 400.61, 400.62, 407, 252/187.24, 187.25, 187.26, 187.27, 252/187.28, 187.29, 187.3; 205/466, 556, 205/746, 756, 563, 265
See application file for complete search history.

(56) References Cited

U.S. PATENT DOCUMENTS

| | | | |
|---|---|---|---|
| 2,121,501 | A | 6/1938 | Hershman |
| 2,155,046 | A | 4/1939 | Griffith et al. |

(Continued)

FOREIGN PATENT DOCUMENTS

| | | |
|---|---|---|
| EP | 1 039 966 | 8/1966 |
| EP | 0 317 066 A2 | 5/1989 |

(Continued)

OTHER PUBLICATIONS

International Search Report mailed Sep. 14, 2011, Ecolab USA Inc., PCT/IB/2011/050100 filed Jan. 10, 2011.

(Continued)

*Primary Examiner* — Joseph D Anthony
(74) *Attorney, Agent, or Firm* — McKee, Voorhees & Sease, P.L.C.

(57) ABSTRACT

Corrosion inhibitor compositions and methods of use are disclosed. Corrosion inhibitors are selected from polyacrylate and calcium corrosion inhibitors, zinc and calcium corrosion inhibitors and/or sugar acids and calcium corrosion inhibitors combined with hypochlorite sources provide use solutions for effective corrosion inhibition for metal surfaces.

23 Claims, 5 Drawing Sheets

(56) References Cited

U.S. PATENT DOCUMENTS

| | | | |
|---|---|---|---|
| 2,977,313 A | 3/1961 | Roland | |
| 3,254,952 A | 6/1966 | Raleigh et al. | |
| 3,440,024 A | 4/1969 | Faust et al. | |
| 3,740,187 A | 6/1973 | Kowalski | |
| 3,965,027 A | 6/1976 | Boffardi et al. | |
| 3,990,983 A | 11/1976 | Lamberti | |
| 4,071,605 A | 1/1978 | Wojtowicz | |
| 4,087,360 A | 5/1978 | Faust et al. | |
| 4,164,477 A | 8/1979 | Whitley | |
| 4,248,690 A | 2/1981 | Conkling | |
| 4,451,376 A | 5/1984 | Sharp | |
| 4,471,789 A | 9/1984 | Boden | |
| 4,561,982 A | 12/1985 | Kuriyama et al. | |
| 4,664,836 A | 5/1987 | Taylor, Jr. et al. | |
| 4,909,986 A | 3/1990 | Kobayashi et al. | |
| 4,936,987 A | 6/1990 | Persinski et al. | |
| 4,992,195 A | 2/1991 | Dolan et al. | |
| 5,006,339 A * | 4/1991 | Bargery et al. | 424/404 |
| 5,047,168 A | 9/1991 | Broze et al. | |
| 5,089,162 A | 2/1992 | Rapisarda et al. | |
| 5,104,584 A | 4/1992 | Kong | |
| 5,111,934 A * | 5/1992 | Morin | 206/229 |
| 5,346,641 A | 9/1994 | Argo et al. | |
| 5,389,284 A | 2/1995 | van der Hoeven et al. | |
| 5,468,411 A | 11/1995 | Dixit et al. | |
| 5,529,711 A | 6/1996 | Brodbeck et al. | |
| 5,547,612 A | 8/1996 | Austin et al. | |
| 5,599,781 A | 2/1997 | Haeggberg et al. | |
| 5,616,234 A | 4/1997 | Rhees et al. | |
| 5,656,584 A | 8/1997 | Angell et al. | |
| 5,688,756 A | 11/1997 | Garabedian, Jr. et al. | |
| 5,695,679 A | 12/1997 | Christie et al. | |
| 5,728,665 A | 3/1998 | Choy et al. | |
| 5,731,276 A | 3/1998 | Argo et al. | |
| 5,750,070 A | 5/1998 | Tang et al. | |
| 5,776,874 A | 7/1998 | MacBeath et al. | |
| 5,783,540 A | 7/1998 | Secemski et al. | |
| 5,851,421 A | 12/1998 | Choy et al. | |
| 5,885,954 A | 3/1999 | Chicarielli | |
| 5,902,781 A | 5/1999 | Painter | |
| 5,912,218 A | 6/1999 | Chatterjee et al. | |
| 5,929,008 A | 7/1999 | Goldstein | |
| 5,929,011 A | 7/1999 | Scepanski | |
| 5,967,157 A | 10/1999 | Chatterjee et al. | |
| 5,968,408 A | 10/1999 | Anderson et al. | |
| 6,093,343 A | 7/2000 | Addison et al. | |
| 6,143,707 A | 11/2000 | Trinh et al. | |
| 6,146,538 A | 11/2000 | Martin | |
| 6,365,101 B1 | 4/2002 | Nguyen et al. | |
| 6,387,862 B2 | 5/2002 | Busch et al. | |
| 6,616,739 B1 | 9/2003 | Spanos | |
| 6,623,695 B2 | 9/2003 | Malchesky et al. | |
| 6,664,289 B2 | 12/2003 | Hansen | |
| 6,712,949 B2 * | 3/2004 | Gopal | 205/466 |
| 6,761,815 B2 * | 7/2004 | Nakajima et al. | 205/466 |
| 6,767,447 B2 * | 7/2004 | Uno et al. | 205/466 |
| 6,773,575 B2 * | 8/2004 | Nakajima et al. | 205/466 |
| 6,776,926 B2 | 8/2004 | Martin | |
| 6,863,830 B1 | 3/2005 | Purdy et al. | |
| 6,921,743 B2 | 7/2005 | Scheper et al. | |
| 7,008,600 B2 * | 3/2006 | Katsigras et al. | 422/292 |
| 7,041,628 B2 | 5/2006 | Sunder et al. | |
| 7,078,462 B2 | 7/2006 | Speed et al. | |
| 7,090,753 B2 | 8/2006 | Sumita | |
| 7,238,272 B2 | 7/2007 | Sano | |
| 7,241,726 B2 | 7/2007 | Song et al. | |
| 7,243,664 B2 | 7/2007 | Berger et al. | |
| 7,452,853 B2 | 11/2008 | Smith et al. | |
| 7,517,847 B2 | 4/2009 | Catalfamo et al. | |
| 7,537,705 B2 | 5/2009 | Mizuno et al. | |
| 7,618,527 B2 | 11/2009 | Schussler et al. | |
| 7,709,434 B2 | 5/2010 | Smith et al. | |
| 7,741,262 B2 | 6/2010 | Smith et al. | |
| 7,759,299 B2 | 7/2010 | Smith et al. | |
| 7,816,314 B2 | 10/2010 | Scheper et al. | |
| 7,960,329 B2 | 6/2011 | Smith et al. | |
| 8,021,493 B2 | 9/2011 | Smith et al. | |
| 8,105,531 B1 * | 1/2012 | Smith et al. | 422/7 |
| 8,114,343 B1 * | 2/2012 | Smith et al. | 422/7 |
| 8,114,344 B1 * | 2/2012 | Smith et al. | 422/7 |
| 8,343,380 B2 * | 1/2013 | Smith et al. | 252/389.61 |
| 8,394,253 B2 * | 3/2013 | Peters et al. | 205/499 |
| 2001/0031249 A1 * | 10/2001 | Oku et al. | 424/65 |
| 2002/0169091 A1 | 11/2002 | Clare et al. | |
| 2003/0063998 A1 | 4/2003 | Ghosh et al. | |
| 2003/0213503 A1 | 11/2003 | Price et al. | |
| 2003/0213505 A1 | 11/2003 | Price et al. | |
| 2003/0220214 A1 | 11/2003 | Ofosu-Asante et al. | |
| 2004/0086463 A1 | 5/2004 | Hansen | |
| 2004/0235680 A1 | 11/2004 | Lawrence et al. | |
| 2005/0075257 A1 | 4/2005 | Scheper et al. | |
| 2005/0211567 A1 | 9/2005 | Fleming | |
| 2005/0239678 A1 | 10/2005 | Nakanishi et al. | |
| 2005/0252532 A1 | 11/2005 | Gray et al. | |
| 2005/0252538 A1 | 11/2005 | Vernon et al. | |
| 2006/0094634 A1 | 5/2006 | Jekel et al. | |
| 2006/0096618 A1 | 5/2006 | Price et al. | |
| 2006/0116309 A1 | 6/2006 | Lambotte et al. | |
| 2006/0122089 A1 | 6/2006 | Lambotte et al. | |
| 2006/0163085 A1 | 7/2006 | Hanaoka | |
| 2007/0095760 A1 * | 5/2007 | Girvan et al. | 210/696 |
| 2007/0138020 A1 | 6/2007 | Balagopal et al. | |
| 2007/0158067 A1 | 7/2007 | Xiao et al. | |
| 2007/0185295 A1 | 8/2007 | Rodrigues et al. | |
| 2007/0261723 A1 | 11/2007 | Price et al. | |
| 2008/0108537 A1 | 5/2008 | Rees | |
| 2008/0145271 A1 | 6/2008 | Kidambi | |
| 2008/0263778 A1 | 10/2008 | Baars et al. | |
| 2008/0287335 A1 | 11/2008 | Smith | |
| 2008/0300160 A1 | 12/2008 | Smith et al. | |
| 2009/0105111 A1 | 4/2009 | Stolte et al. | |
| 2009/0148342 A1 | 6/2009 | Bromberg et al. | |
| 2009/0209490 A1 | 8/2009 | Nakanishi et al. | |
| 2010/0140544 A1 | 6/2010 | Smith et al. | |
| 2010/0173820 A1 | 7/2010 | Smith et al. | |
| 2011/0067732 A1 * | 3/2011 | Smith et al. | 134/10 |
| 2011/0168567 A1 * | 7/2011 | Smith et al. | 205/350 |
| 2012/0156313 A1 * | 6/2012 | Smith et al. | 424/663 |
| 2012/0247970 A1 * | 10/2012 | Olson et al. | 205/508 |
| 2012/0273374 A1 * | 11/2012 | Olson et al. | 206/232 |
| 2012/0291800 A1 * | 11/2012 | Johnson et al. | 134/3 |

FOREIGN PATENT DOCUMENTS

| | | |
|---|---|---|
| EP | 0 425 283 A2 | 5/1991 |
| EP | 0 518 720 A1 | 12/1992 |
| EP | 0 594 314 A1 | 4/1994 |
| EP | 0 723 006 A2 | 7/1996 |
| EP | 1 348 755 A3 | 10/2003 |
| EP | 1 588 617 A1 | 10/2005 |
| EP | 1 598 465 A1 | 11/2005 |
| EP | 1 598 467 A1 | 11/2005 |
| EP | 1 598 468 A1 | 11/2005 |
| EP | 1 598 469 A1 | 11/2005 |
| EP | 1 598 470 A1 | 11/2005 |
| EP | 1 598 471 A1 | 11/2005 |
| EP | 1 605 089 A1 | 12/2005 |
| EP | 1 673 974 A1 | 6/2006 |
| JP | 1129601 | 2/1999 |
| JP | 2000-571 A | 1/2000 |
| JP | 2001-310187 A | 11/2001 |
| JP | 2008-259961 | 10/2008 |
| WO | WO 94/00545 A1 | 1/1994 |
| WO | WO 94/03574 A1 | 2/1994 |
| WO | WO 94/17170 A1 | 8/1994 |
| WO | WO 95/12652 A1 | 5/1995 |
| WO | WO 2005/011760 A1 | 2/2005 |
| WO | WO 2005/093129 A1 | 10/2005 |
| WO | WO 2005/116319 A1 | 12/2005 |
| WO | WO 2007/109327 A2 | 9/2007 |
| WO | WO 2008/155755 A1 | 12/2008 |

(56) References Cited

OTHER PUBLICATIONS

Abd El-Maksoud, S. A., et al., "Electrochemical behaviour of low carbon steel in gluconate and tartarate solutions" Electrochimica Acta 50 (2005), pp. 1985-1991.
JP 1129601—Mitsubishi Gas Chem. Co., Inc.—English Abstract.
JP 2000-571—Organo KK—English Abstract.
JP 2001-310187—Kurita Water Ind. Ltd.—English Abstract.
JP 2008-259961—Kurita Water Ind. Ltd.—English Abstract.
Clorox Professional Products Company, Material Safety Data Sheet, Clorox Commercial Solutions® Clorox® Disinfecting Wipes Fresh Scent, EPA Reg. No. 67619-9, Feb. 2, 2011, 1 page.
Caltech Industries, Inc., Material Safety Data Sheet, Dispatch® Hospital Cleaner Disinfectant Towels With Bleach, C 021 09, Jul. 10, 2009, 4 pages.

\* cited by examiner

| ppm total Inhibitor in bleach concentrate before dilution | Wt Zn Cl2/CaCl2 | Visual Rust vs pH | | | | |
|---|---|---|---|---|---|---|
| | | 3 | 5 | 7 | 9 | 11 |
| 62.5 | 1/4 | rust | borderline | no | no | no |
| 62.5 | 4/1 | rust | rust | no | no | no |
| 250 | 1/4 | rust | borderline | no | no | no |
| 250 | 4/1 | rust | rust | no | no | no |
| 500 | 1/4 | rust | borderline | no | no | no |
| 500 | 4/1 | rust | borderline | no | no | no |
| 1000 | 1/4 | rust | rust | no | no | no |
| 1000 | 4/1 | rust | borderline | no | no | no |
| 1250 | 1/4 | rust | rust | no | no | no |
| 1250 | 4/1 | rust | rust | no | no | no |

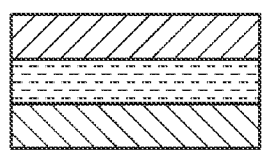

= rust/corrosion observed
= borderline rust/corrosion observed
= no rust/corrosion observed

*FIG. 2*

CORROSION INHIBITION OF HYPOCHLORITE SOLUTIONS IN SATURATED WIPES

CROSS-REFERENCE TO RELATED APPLICATIONS

This application is Continuation-in-Part Application of U.S. Ser. No. 13/292,598 filed Nov. 9, 2011, entitled Corrosion Inhibition of Hypochlorite Solutions Using Sugar Acids and Ca, which is a Divisional Application of U.S. Ser. No. 12/974,520 filed Dec. 21, 2010, which is now U.S. Pat. No. 8,114,344. The entire contents of these patents and patent applications are hereby expressly incorporated herein by reference including, without limitation, the specification, claims, and abstract, as well as any figures, tables, or drawings thereof.

This application is also related to U.S. Pat. No. 8,114,343, filed Dec. 21, 2010, entitled Corrosion Inhibition of Hypochlorite Solutions Using Zn and Ca, and U.S. Pat. No. 8,105,531, filed Dec. 21, 2010, entitled Corrosion Inhibition of Hypochlorite Solutions Using Polyacrylate and Ca. The entire contents of these patents and patent applications are hereby expressly incorporated herein by reference including, without limitation, the specification, claims, and abstract, as well as any figures, tables, or drawings thereof.

FIELD OF THE INVENTION

The invention relates to corrosion inhibitor compositions and methods of using the same. In particular, polyacrylate and calcium compounds, sugar acids and calcium compounds and/or zinc and calcium compounds are used with hypochlorite sources and have the beneficial effect of corrosion inhibition of metal in contact with hypochlorite sources. The present compositions and methods employing the compositions in the form of cleaning wipes are effective in reducing and/or eliminating the corrosive effects of hypochlorite on treated metal surfaces.

BACKGROUND OF THE INVENTION

Sodium hypochlorite solutions are commonly used and highly effective as bleaches and sanitizers for cleaning a variety of surfaces. However, sodium hypochlorite solutions are extremely corrosive to many treated surfaces, in particular, metal surfaces become highly corroded and discolored. Hypochlorite solutions corrode surfaces as a result of its composition of sodium hypochlorite, sodium chloride and often sodium hydroxide, each having distinct mechanisms of corrosion. Sodium hypochlorite is a strong oxidant causing metal corrosion through a redox attack. Sodium chloride attacks and penetrates the passivation layer of metals, resulting in pitting of the surface. In addition, sodium hydroxide is corrosive to metals as a result of formation of metal hydroxide. Additional descriptions of the mechanisms of corrosion are disclosed in Corrosion Basics, National Association of Corrosion Engineers, 1984.

Despite the corrosion caused by hypochlorite solutions on various surfaces, there remains a need for effective cleaning, disinfecting and/or sanitizing using hypochlorite solutions. In particular, industrial settings often rely upon the cleaning, disinfecting and/or sanitizing efficacy of oxidizing compositions employing hypochlorite. The healthcare market, namely hospitals, use hypochlorite compositions for its efficacy in killing bacterial spores, such as *C. difficile*. Therefore, it is an objective of the claimed invention to develop corrosion inhibitor compositions suitable for use with hypochlorite solutions on a variety of surfaces.

Various cleaning wipes have long been used for a variety of purposes. Cleaning wipes have contained various compounds to accomplish their intended purpose. For example, commercially-available cleaning wipes have included hypochlorite solutions, which are particularly well suited for use in cleaning, disinfecting and/or sanitizing. However, as is well recognized, the various commercial formulations including hypochlorite in saturated wipes result in significant discoloration and corrosion on the treated surfaces. Therefore it is a further objective of the invention to provide methods for hypochlorite corrosion inhibition, including the use of saturated wipes comprising the hypochlorite solution and the corrosion inhibitors according to the invention.

It is a further objective of the claimed invention to develop corrosion inhibitor compositions to simultaneously prevent all corrosive mechanisms of sodium hypochlorite solution on metal surfaces, including both corrosion and discoloration.

A still further object of the claimed invention is a corrosion inhibitor composition capable of preventing metal corrosion caused by sodium hypochlorite solutions without adversely impacting the stability of the hypochlorite solution.

BRIEF SUMMARY OF THE INVENTION

Unexpectedly, the present invention provides compositions and methods of use that synergistically reduce corrosion of metal surfaces treated with hypochlorite bleach solutions. An advantage of the invention is a corrosion inhibitor composition that simultaneously prevents the corrosive mechanisms of hypochlorite solutions on treated surfaces. It is an advantage of the present invention that the claimed methods and compositions prevent substrate corrosion caused by hypochlorite solutions without adversely impacting the stability of the hypochlorite solution.

Corrosion inhibitor compositions according to the invention may comprise a woven or non-woven material forming a wipe saturated with the composition; a hypochlorite source; and a corrosion inhibitor comprising a water soluble calcium compound and a member selected from the group consisting of a zinc compound, a polyacrylate compound, and a sugar acid, wherein the pH of said composition is at least about 7 and wherein the composition does not cause corrosion and/or discoloration on a treated metal surface. In preferred aspects, the hypochlorite source includes sodium hypochlorite and at least one of sodium chloride and sodium hydroxide, wherein said hypochlorite source is free of carbonate and bicarbonate anions. In addition the composition has a ratio of hypochlorite source to corrosion inhibitor from about 10:1 to about 600:1. Preferably, the corrosion inhibitor is an EPA approved inert material for antimicrobial formulations and does not adversely impact the stability of the hypochlorite source.

In preferred compositions the corrosion inhibitor is a combination of a water soluble zinc salt and a water soluble calcium salt, wherein said salts have a chloride or non-halide anion and are not effective as oxidizing agents or reducing agents. More preferably, the zinc salt includes zinc chloride and/or zinc sulfate and the calcium salt includes calcium chloride and/or calcium sulfate, and the ratio of said zinc salt to said calcium salt is from about 4:1 to about 1:4.

A further embodiment of the corrosion inhibitor compositions according to the invention may comprise a woven or non-woven material forming a wipe saturated with the composition; a hypochlorite source comprising sodium hypochlorite, sodium chloride and sodium hydroxide; and about 0.01 to about 2 wt-% corrosion inhibitor comprising a water soluble calcium salt and a member selected from the group consisting of a water soluble zinc salt, a non-thickening polymeric salt having a molecular weight less than about 10,000, and a sugar acid and, wherein the pH of said composition is at least about 7, the ratio of said hypochlorite source to corrosion inhibitor is from about 10:1 to about 600:1 and the ratio of said zinc salt, polymeric salt or sugar acid to said calcium salt is from about 6:1 to about 1:6, and wherein the composition does not cause corrosion and/or discoloration on a treated metal surface.

A method for inhibiting corrosion and/or discoloration of a surface contacted by a hypochlorite source is disclosed as comprising providing a corrosion inhibitor composition in a saturated wipe comprising a woven or non-woven material, a hypochlorite source and a corrosion inhibitor comprising a water soluble calcium salt and a member selected from the group consisting of a water soluble zinc salt, a non-thickening polymeric salt having a molecular weight less than about 10,000, and a sugar acid and, wherein the pH of said composition is at least about 7, the ratio of said hypochlorite source to corrosion inhibitor is from about 10:1 to about 600:1 and the ratio of said zinc salt, polymeric salt or sugar acid to said calcium salt is from about 6:1 to about 1:6; and contacting said corrosion inhibitor composition with a surface in need of cleaning, sanitizing and/or disinfecting, wherein said composition inhibits the corrosion and/or discoloration of said surface in the presence of said hypochlorite source.

Kits for employing the corrosion inhibitor compositions of the invention are also provided. A kit may include a container of woven or non-woven material forming a wipe saturated with the corrosion inhibitor composition and instructions for use. Alternatively a kit may include a container of woven or non-woven material for use as a wipe, a corrosion inhibitor composition, and instructions for use to combine and use the wipes with the corrosion inhibitor composition.

BRIEF DESCRIPTION OF THE DRAWINGS

FIG. 2 shows data demonstrating the effect of pH on corrosion of stainless steel with ready-to-use corrosion inhibitor.

Figure 1:
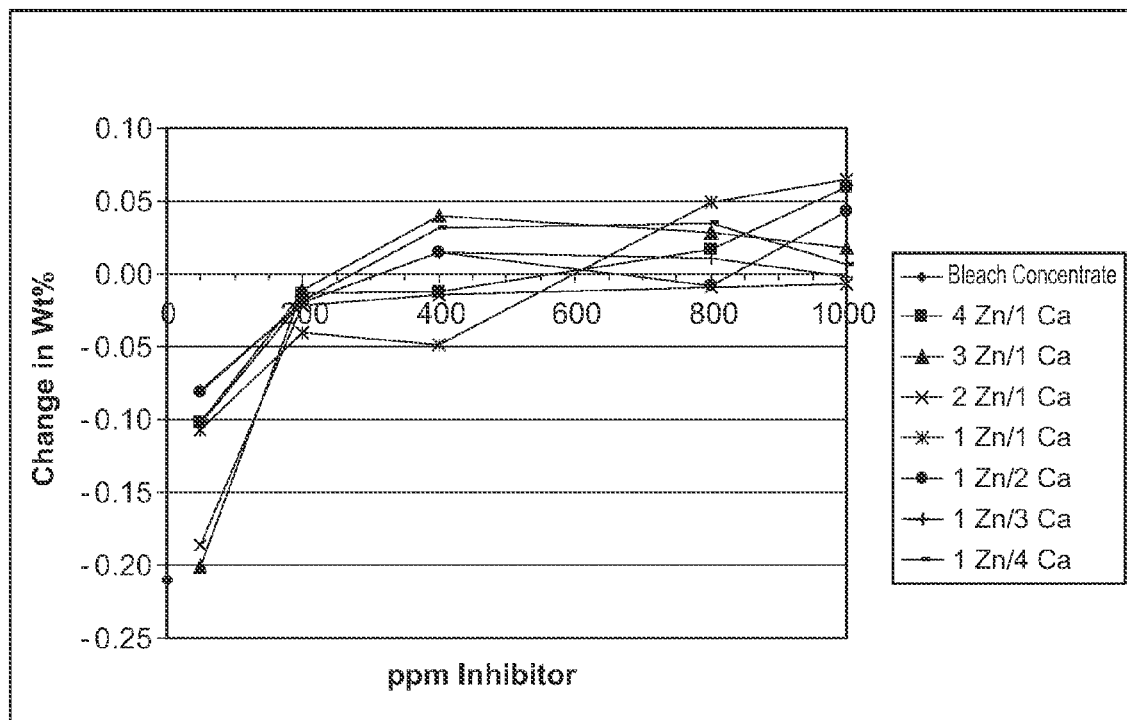
FIG. 1 shows data from Example 3 in the form of a graph illustrating the effect of zinc/calcium corrosion inhibitor concentration ratio on the corrosiveness of a bleach concentrate.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The embodiments of this invention are not limited to particular corrosion inhibitor compositions and methods of using the same, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities refers to variation in the numerical quantity that can occur.

The term "bleaching agent," as used herein can refer to agents used for example to sanitize, lighten or whiten a substrate, and may include bleaching compounds capable of liberating an active halogen species, such as $Cl_2$, $Br_2$, $L_2$, $ClO_2$, $BrO_2$, $IO_2$, $OCl^-$, $—OBr^-$ and/or, $—OI^-$, under conditions typically encountered during the cleansing process. Bleaching agents for use in the present invention include, for example, chlorine-containing compounds such as a chlorite or a hypochlorite.

The terms "chelating agent" and "sequestrant" as used herein, refer to a compound that forms a complex (soluble or not) with water hardness ions in a specific molar ratio. Chelating agents that can form a water soluble complex include for example, sodium tripolyphosphate, EDTA, DTPA, NTA, citrate, and the like. Sequestrants that can form an insoluble complex include for example, sodium triphosphate, zeolite A, and the like.

The term "chlorine-containing oxidant," as used herein, refers to oxidants produced according to electrolysis methods of sodium hydroxide solutions and may include for example, inorganic hypochlorite salts (such as sodium hypochlorite), hypochlorous acid, chlorine and $Cl_2$ (gas).

As used herein, the term "disinfectant" refers to an agent that kills all vegetative cells including most recognized pathogenic microorganisms, using the procedure described in *A.O.A.C. Use Dilution Methods*, Official Methods of Analysis of the Association of Official Analytical Chemists, paragraph 955.14 and applicable sections, 15th Edition, 1990 (EPA Guideline 91-2). As used herein, the term "high level disinfection" or "high level disinfectant" refers to a compound or composition that kills substantially all organisms, except high levels of bacterial spores, and is effected with a chemical germicide cleared for marketing as a sterilant by the Food and Drug Administration. As used herein, the term "intermediate-level disinfection" or "intermediate level disinfectant" refers to a compound or composition that kills mycobacteria, most viruses, and bacteria with a chemical germicide registered as a tuberculocide by the Environmental Protection Agency (EPA). As used herein, the term "low-level disinfection" or "low level disinfectant" refers to a compound or composition that kills some viruses and bacteria with a chemical germicide registered as a hospital disinfectant by the EPA.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

The term "hard surface," as used herein, includes surfaces including, for example, showers, sinks, toilets, bathtubs, countertops, windows, mirrors, transportation vehicles, floors, and the like.

The phrase "health care surface," as used herein, refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

The term "hypochlorite," as used herein, refers to a salt of hypochlorous acid. A hypochlorite ion is $ClO^-$ and therefore a hypochlorite compound is a chemical compound containing this group having a chlorine in the oxidation state (+1). The oxidative state results in very low stability, causing hypochlorites to be very strong oxidizing agents. One skilled in the art may recognize that other chlorine-containing bleaches such chlorate ions or even chlorine dioxide can be formed by modifying the pH or starting materials for an electrochemical cell. A common example of a hypochlorite is the bleaching agent sodium hypochlorite. As used herein, sodium hypochlorite (NaOCl) may be used interchangeably with hypochlorite. Hypochlorous acid is a more effective sanitizer than hypochlorite and is chemically preferred when the pH of a bleach solution is decreased. For purposes of describing the present invention, the description of the use of threshold agents for electrochemical cells producing hypochlorite shall also be understood to incorporate cells producing hypochlorous acid. For further purposes of the present invention, hypochlorite and hypochlorous acid shall also refer to a chlorine-containing oxidant as described herein.

The terms "hypochlorite," "hypochlorite solution," "sodium hypochlorite solution" and variations thereof, as used herein, also refer to certain embodiments of the invention employing a mixture of sodium hypochlorite, sodium chloride, and optionally sodium hydroxide.

The term "instrument," as used herein, refers to the various medical or dental instruments or devices that can benefit from cleaning with a stabilized composition according to the present invention. The phrases "medical instrument", "dental instrument", "medical device", "dental device", "medical equipment", or "dental equipment" refer to instruments, devices, tools, appliances, apparatus, and equipment used in medicine or dentistry. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism. For the purpose of this patent application, successful microbial reduction is achieved when the microbial populations are reduced by at least about 50%, or by significantly more than is achieved by a wash with water. Larger reductions in microbial population provide greater levels of protection.

As used herein, the term "sanitizer" refers to an agent that reduces the number of bacterial contaminants to safe levels as judged by public health requirements. In an embodiment, sanitizers for use in this invention will provide at least a 99.999% reduction (5-log order reduction). These reductions can be evaluated using a procedure set out in *Germicidal and Detergent Sanitizing Action of Disinfectants*, Official Methods of Analysis of the Association of Official Analytical Chemists, paragraph 960.09 and applicable sections, 15th Edition, 1990 (EPA Guideline 91-2). According to this reference a sanitizer should provide a 99.999% reduction (5-log order reduction) within 30 seconds at room temperature, $25 \pm 2°$ C., against several test organisms.

As used in this invention, the term "sporicide" refers to a physical or chemical agent or process having the ability to cause greater than a 90% reduction (1-log order reduction) in the population of spores of *Bacillus cereus* or *Bacillus subtilis* within 10 seconds at 60° C. In certain embodiments, the sporicidal compositions of the invention provide greater than a 99% reduction (2-log order reduction), greater than a 99.99% reduction (4-log order reduction), or greater than a 99.999% reduction (Slog order reduction) in such population within 10 seconds at 60° C.

Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbistatic. A sanitizer and a disinfectant are, by definition, agents which provide antimicrobial or microbiocidal activity. In contrast, a preservative is generally described as an inhibitor or microbistatic composition As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polycarbonate polymers (PC), acrilonitrile-butadiene-styrene polymers (ABS), and polysulfone polymers (PS). Another exemplary plastic that can be cleaned using the compounds and compositions of the invention include polyethylene terephthalate (PET).

The term, "water soluble," as used herein, refers to a compound that can be dissolved in water at a concentration of more than about 1 wt-%. Alternatively, the terms "sparingly soluble" or "sparingly water soluble" refer to a compound that can be dissolved in water only to a concentration of about 0.1 to about 1.0 wt-%. The term "water insoluble" refers to a compound that can be dissolved in water only to a concentration of less than about 0.1 wt-%.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

Commercially-available corrosion inhibitors for nonmetal surfaces, such as glass, often work by causing controlled precipitation of calcium salts and other hard water sources and/or preventing redeposition of hardness sources, in order to reduce etching and/or corrosion of treated surfaces. For example, calcium gluconate is a corrosion and/or etch inhibitor that may be combined with a magnesium, zinc and/or aluminum ion source. Further description of such etch and corrosion inhibition systems are disclosed in U.S. Pat. Nos. 7,709,434 and 7,759,299 and U.S. patent application Ser. Nos. 12/114,364, 12/114,342 and 12/726,179, the disclosures of which are herein incorporated in its entirety. Such corrosion inhibitor compositions have been found to provide suitable etch protection to glass and soft metal surfaces, such as aluminum, against corrosive attack by alkalinity in warewash detergents. Examples of additional corrosion, salt deposit and scale-inhibitor systems known in the art, include for example U.S. Pat. No. 3,965,027 the disclosure of which is herein incorporated in its entirety.

Corrosion-Inhibited Compositions

Unlike the present invention, prior corrosion inhibitor systems are not incorporated directly into the highly corrosive hypochlorite bleach formulas and solutions. Accordingly, the compositions according to the present invention provide the benefit of anticorrosive effects traditionally observed when metal surfaces are contacted with hypochlorite solutions at concentrations often as low as about 100 ppm. The corrosion inhibitor compositions according to the invention are suitable for use in any application where it is desirable to reduce surface corrosion and/or discoloration caused by such hypochlorite solutions. The anticorrosive and anti-discoloration effects are obtained at a rate of corrosion and/or discoloration of a treated surfaces that is less than the rate of corrosion and/or discoloration for an otherwise identical use solution of hypochlorite except for the absence of the corrosion inhibitor according to the invention.

Although not limiting to the present invention, it is believed that, in certain embodiments, the combined use of a corrosion inhibitor (e.g. water soluble, non-thickening polyacrylate compound, water soluble zinc, or sugar acid) and water soluble calcium salt according to the invention, provides a mechanism of synergistic corrosion and/or discoloration inhibition. The calcium compound forms a microscopic protective film on the surface of articles exposed to the present corrosion inhibitor composition. The protective film can be transparent or not visible to the unaided eye and functions as a protective layer to slow or prevent the corrosive hypochlorite solutions components, namely sodium hypochlorite, sodium chloride and often sodium hydroxide, from attacking and corroding the surface of the article via the different corrosive mechanisms. According to a theory of the invention, the film may function to allow the corrosive hypochlorite solution to attack and remove portions of the film, rather than attack the surface of the article. The combined use of the corrosion inhibitor provides further mechanism of corrosion inhibition that acts in synergy with the calcium compound.

According to one embodiment of the invention, unexpected and synergistic means for corrosion and/or discoloration inhibition of hypochlorite solutions are achieved with the use of polyacrylates as the corrosion inhibitor. The anticorrosion effects are highly unexpected as polyacrylates are known to be added to detergents for use to control calcium, in use as a threshold agent. As used herein, "threshold agent" refers to a compound that inhibits crystallization of water hardness ions from solution, but that does not form a specific complex with the water hardness ion, distinguishing a threshold agent from a chelating or sequestering agent. Accordingly, it is unexpected and counter-intuitive that any anticorrosion effects are obtained when added to a source of calcium according to the various embodiments of the invention.

Zinc Corrosion Inhibitor Compositions

According to an embodiment of the invention, a corrosion inhibitor composition is disclosed and comprises, consists of and/or consists essentially of a hypochlorite source and a corrosion inhibitor comprising both a zinc compound and a calcium compound. The corrosion inhibitor package of a zinc and calcium compound exhibits excellent corrosion and/or discoloration inhibition for metal surfaces in the presences of a hypochlorite source. The corrosion inhibitor package according to the invention may therefore be added to compositions, wherein hypochlorite sources are employed, to inhibit the corrosion of metal surfaces. The combination of the zinc compound and calcium compound generate synergistic increases in corrosion and/or discoloration inhibition caused by hypochlorite sources, compared to corrosion inhibition obtained with the use of either a zinc compound or calcium compound alone.

The zinc compound and calcium compound according to the corrosion inhibitor compositions provide a source of zinc and calcium ions. Any water soluble zinc and calcium compounds that provide zinc and calcium ions may be used according to the invention. The sources of each ion can be provided as elemental metals, organic salts, inorganic salts, organic oxides, inorganic oxides or mixtures thereof. The sources of each ion can further be provided as an anhydrous compound or as a hydrated component. Preferably the zinc compound is a source of zinc cations.

According to an embodiment of the invention, the zinc and calcium corrosion inhibitor package is preferably comprised of a water soluble zinc salt and a water soluble calcium salt.

According to an embodiment of the invention, the water soluble zinc salt and water soluble calcium salt are sufficiently water-soluble so that when the composition is combined with a diluent, such as water, the compounds dissolve. In this context, sufficiently water-soluble means that the salts dissolve at a relatively quick rate in water. In an embodiment of the invention, the solubility of the water soluble zinc and calcium salts is at least about 0.5 wt-% in water at about 20° C. and atmospheric pressure. In an embodiment of the invention, the water soluble calcium and zinc salts remain soluble in solution. In a further embodiment, the water soluble calcium and zinc salts remain dispersed in solution.

According to an embodiment of the invention, the zinc and calcium salts of the corrosion inhibitor composition have a chloride or non-halide anion. According to a preferred embodiment, the zinc and calcium salts do not contain bromide or iodide anions. Although not intending to be limited according to a particular theory of the invention, a corrosion inhibitor composition with non-halide anions, particularly not containing bromide or iodide anions, avoids conversion of the ions into hypobromite and/or hypoiodite oxidants through the in situ reaction of the bromide and iodide with the hypochlorite. In an aspect of the invention, any halide anion, other than chloride, is not desirable for use in the corrosion inhibitor composition. According to a further embodiment of the invention, the zinc and calcium salts of the corrosion inhibitor are free of aluminum and magnesium ions.

Suitable water soluble zinc salts according to the invention are not effective as oxidizing agents or reducing agents. In addition, suitable water soluble zinc salts do not contain an anion that acts as a bleach catalyst. Still further, oxidizing halogens and/or their hypohalous acids are not desirable for use according to the invention. Zinc salts may include, for example, zinc acetate, zinc benzoate, zinc chlorate, zinc chloride, zinc dihydrogen phosphate, zinc formate, zinc gluconate, zinc glycerophosphate, zinc lactate, zinc metasilicate, zinc nitrate, zinc pantothenate, zinc phosphate, zinc salicylate, zinc succinate, zinc sulfate, a hydrate thereof, and a mixtures thereof or the like. Particularly well suited zinc salts include, for example, zinc acetate, zinc benzoate, zinc chloride, zinc formate, zinc gluconate, zinc lactate, zinc pantothenate, zinc salicylate, zinc succinate, zinc sulfate, a hydrate thereof, and mixtures thereof or the like. The salts can be provided as hydrated salts or anhydrous salts. Exceptionally suitable zinc salts for the corrosion inhibitor composition include zinc chloride and zinc sulfate.

Sugar Acid Corrosion Inhibitor Compositions

According to an embodiment of the invention, a corrosion inhibitor composition is disclosed and comprises, consists of and/or consists essentially of a hypochlorite source and a corrosion inhibitor comprising both a sugar acid and a calcium compound. The corrosion inhibitor package of a sugar acid and calcium compound exhibits excellent corrosion and/or discoloration inhibition for metal surfaces in the presences of a hypochlorite source. The corrosion inhibitor package according to the invention may therefore be added to compositions, wherein hypochlorite sources are employed, to inhibit the corrosion of metal surfaces. The combination of the sugar acid and calcium compound generate synergistic increases in corrosion inhibition caused by hypochlorite sources, compared to corrosion and/or discoloration inhibition obtained with the use of either a sugar acid or calcium compound alone.

The sugar acid and calcium compound according to the corrosion inhibitor compositions provide a source of calcium ions. Any water soluble calcium compound that provides calcium ions may be used according to the invention. The sources of calcium ions can be provided as elemental metals, organic salts, inorganic salts, organic oxides, inorganic oxides or mixtures thereof. The sources of calcium ions can further be provided as an anhydrous compound or as a hydrated component.

According to an embodiment of the invention, any sugar acid may be utilized and/or any oxidation product of a sugar acid. Sugar acids include monosaccharides with an —OH group oxidized to a carboxyl group. Exemplary sugar acids include aldonic acids, ulosonic acids, uronic acids and aldaric acids. As one skilled in the art will ascertain, aldonic acids are those sugar acids where the aldehyde functional group of an aldose is oxidized. Ulosonic acids are those sugar acids in which a keto-acid is formed via oxidation of the first hydroxyl of a 2-ketose is oxidized. Uronic acids are those sugar acids where an aldose's or ketose's first hydroxyl group is oxidized. Finally, aldaric acids are those sugar acids with both ends of an aldose oxidized.

Suitable sugar acids according to the invention include the following non-limiting examples, including ascorbic acid, gluconic acid, galaturonic acid, mucic acid, and glucaric acid. Both ascorbic acid and gluconic acid are particularly suitable sugar acids for use in the corrosion inhibitor package. As one skilled in the art shall ascertain, ascorbic acid may be considered a "vinyl" carboxylic acid with the double bond's electrons shared between the hydroxyl and the carbonyl moieties. There are two resonance structures for the deprotonated form, differing in the position of the double bond. Ascorbic acid might also be considered an enol. The deprotonated form would then be a strongly basic enolate with the adjacent double bond stabilizing the deprotonated form.

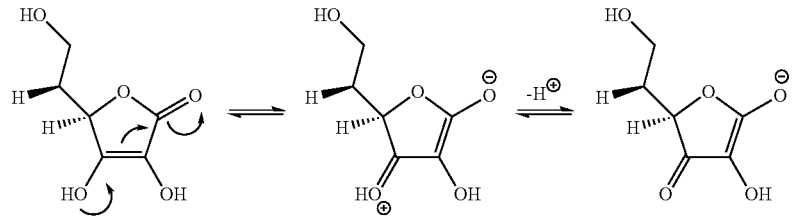

According to an embodiment of the invention, the sugar acid and calcium corrosion inhibitor package is preferably comprised of a sugar acid selected from the group consisting of ascorbic acid, gluconic acid, galaturonic acid, mucic acid, and glucaric acid and a water soluble calcium salt. The sugar acid and water soluble calcium salt are sufficiently water-soluble so that when the composition is combined with a diluent, such as water, the compounds dissolve. In this context, sufficiently water-soluble means that the salts dissolve at a relatively quick rate in water. In an embodiment of the invention, the solubility of the water soluble zinc and calcium salts is at least about 0.5 wt-% in water at about 20° C. and atmospheric pressure. In an embodiment of the invention, the water soluble calcium and sugar acid remain soluble in solution. In a further embodiment, the water soluble calcium and sugar acid remain dispersed in solution.

According to an embodiment of the invention, the calcium salt of the corrosion inhibitor composition has a chloride or non-halide anion. According to a preferred embodiment, the calcium salt does not contain bromide or iodide anions. Although not intending to be limited according to a particular theory of the invention, a corrosion inhibitor composition with non-halide anions, particularly not containing bromide or iodide anions, avoids conversion of the ions into hypobromite and/or hypoiodite oxidants through the in situ reaction of the bromide and iodide with the hypochlorite. According to a further embodiment of the invention, the zinc and calcium salts of the corrosion inhibitor are free of aluminum and magnesium ions.

Polyacrylate Corrosion Inhibitor Compositions

According to an embodiment of the invention, a corrosion inhibitor composition is disclosed and comprises, consists of and/or consists essentially of a hypochlorite source and a corrosion inhibitor comprising both a polyacrylate compound and a calcium compound. The corrosion inhibitor package of a polyacrylate and calcium compound exhibits excellent corrosion and/or discoloration inhibition for metal surfaces in the presences of a hypochlorite source. The corrosion inhibitor package according to the invention may therefore be added to compositions, wherein hypochlorite sources are employed, to inhibit the corrosion of metal surfaces. The combination of the polyacrylate compound and calcium compound generate synergistic increases in corrosion and/or discoloration inhibition caused by hypochlorite sources, compared to corrosion inhibition obtained with the use of either a polyacrylate compound or calcium compound alone.

The calcium compound according to the corrosion inhibitor compositions provides a source of calcium ions. Any water soluble calcium compounds that provide calcium ions may be used according to the invention. The sources of calcium ions can be provided as elemental metals, organic salts, inorganic salts, organic oxides, inorganic oxides or mixtures thereof. The sources of calcium ions can further be provided as an anhydrous compound or as a hydrated component.

According to an embodiment of the invention, the polyacrylate is a non-thickening polyacrylate. The polyacrylate compound may further be a polyacrylate derivative. Suitable polyacrylate compounds according to the invention are not effective as thickening agents, oxidizing agents and/or reducing agents. In addition, suitable polyacrylate compounds do not contain an anion that acts as a bleach catalyst.

According to an embodiment of the invention, the polyacrylate and calcium corrosion inhibitor package is preferably comprised of a water soluble polyacrylate salt (also referred to as a polymeric salt according to the invention) and a water soluble calcium salt. In addition, copolymers and homopolymers of the water soluble polyacrylate salts may be used for the corrosion inhibitor package. The water soluble polymeric salt and water soluble calcium salt are sufficiently water-soluble so that when the composition is combined with a diluent, such as water, the compounds dissolve. In this context, sufficiently water-soluble means that the salts dissolve at a relatively quick rate in water. In an embodiment of the invention, the solubility of the water soluble zinc and calcium salts is at least about 0.5 wt-% in water at about 20° C. and atmospheric pressure. In an embodiment of the invention, the water soluble calcium and polymeric salts remain soluble in solution. In a further embodiment, the water soluble calcium and polymeric salts remain dispersed in solution.

According to an embodiment of the invention, the polymeric and calcium salts of the corrosion inhibitor composition have a chloride or non-halide anion. According to a preferred embodiment, the polymeric and calcium salts do not contain bromide or iodide anions. Although not intending to be limited according to a particular theory of the invention, a corrosion inhibitor composition with non-halide anions, particularly not containing bromide or iodide anions, avoids conversion of the ions into hypobromite and/or hypoiodite oxidants through the in situ reaction of the bromide and iodide with the hypochlorite. According to a further embodiment of the invention, the polymeric and calcium salts of the corrosion inhibitor are free of aluminum and magnesium ions.

Suitable water soluble polymeric salts according to the invention are not effective as thickening agents, oxidizing agents and/or reducing agents. In addition, suitable water soluble polymeric salts do not contain an anion or cation that acts as a bleach catalyst. Still further, oxidizing halogens and/or their hypohalous acids are not desirable for use according to the invention. Exceptionally suitable polymeric salts for the corrosion inhibitor composition include sodium polyacrylate, sodium methacrylate, a hydrate thereof, and a mixtures thereof or the like. The salts can be provided as hydrated salts or anhydrous salts.

Preferably, the polyacrylates and, polymeric salts for the corrosion inhibitor composition according to the invention have a molecular weight of less than about 10,000, preferably less than about 7,000, and more preferably less than about 4,000. The molecular weight ranges of the preferred polyacrylates and polymeric salts for the corrosion inhibitor composition according to the invention correlate with the non-thickening properties of the polyacrylate corrosion inhibitors.

Calcium Component of Corrosion Inhibitor Packages

According to any of the corrosion inhibitor compositions disclosed herein, suitable calcium compounds include calcium cations from a water soluble salt of calcium. Water soluble calcium salts are particularly well suited for use in the corrosion inhibitor compositions. Suitable water soluble calcium salts according to the invention are not effective as oxidizing agents or reducing agents. In addition, suitable water soluble calcium salts do not contain an anion that acts as a bleach catalyst. Still further, oxidizing halogens and/or their hypohalous acids are not desirable for use according to the invention. For example, halide anions other than chloride are not desirable for use according to the invention.

Suitable calcium salts may include, for example, calcium acetate, calcium benzoate, calcium chlorate, calcium chloride, calcium dihydrogen phosphate, calcium formate, calcium gluconate, calcium glycerophosphate, calcium lactate, calcium metasilicate, calcium nitrate, calcium pantothenate, calcium phosphate, calcium salicylate, calcium succinate, calcium sulfate, a hydrate thereof, and a mixtures thereof or the like. Particularly well suited calcium salts include, calcium acetate, calcium benzoate, calcium chloride, calcium formate, calcium gluconate, calcium lactate, calcium pantothenate, calcium salicylate, calcium succinate, calcium sulfate, a hydrate thereof, and mixtures thereof or the like. The salts can be provided as hydrated salts or anhydrous salts.

Exceptionally suitable calcium salts for the corrosion inhibitor composition include calcium chloride and calcium sulfate.

According to an embodiment of the invention the corrosion inhibitor compositions comprise low levels of corrosion-inhibiting additives. According to a preferred embodiment the corrosion inhibitor compositions comprise ingredients on the U.S. Environmental Protection Agency (EPA) Inert Ingredient List for antimicrobial formulations.

According to the invention, a variety of hypochlorite sources may be utilized. The corrosion inhibitor is preferably a bleach hypochlorite solution. The hypochlorite source according to the invention may include any monovalent alkali metal salt of hypochlorous acid, including for example, potassium, lithium and/or sodium. In one aspect, the hypochlorite source according to the invention includes sodium hypochlorite and sodium chloride. The hypochlorite source may further optionally include sodium hydroxide. A commercially-available hypochlorite source is XY-12, available from Ecolab, Inc. and provides a concentrated bleach hypochlorite suitable for use according to the invention. Preferably the hypochlorite solution is free of carbonate or bicarbonate anions.

The concentration of hypochlorite in a composition according to the invention, including a use solution may range from about 10 ppm to about 50,000 ppm. Preferably, the concentration of hypochlorite in a composition is between about 100 ppm to about 25,000 ppm, more preferably between about 500 ppm to about 10,000 ppm.

The corrosion inhibitor compositions according to the invention have a suitable ratio of a hypochlorite source to corrosion inhibitor from about 10:1 to about 600:1. According to the invention, the level of corrosion inhibitor in a hypochlorite solution varies with the particular ratio of the corrosion inhibitor agent to calcium utilized for the corrosion inhibitor package. Particularly suitable ratios of hypochlorite source to corrosion inhibitor are from about 50:1 to about 200:1, from about 40:1 to about 150:1, from about 30:1 to about 100:1, from about 20:1 to about 50:1, and from about 10:1 to about 1:1.

The corrosion inhibitor composition can include a corrosion inhibitor package, comprising a corrosion inhibitor and calcium compound, in an amount from about 0.01 wt-% to about 50 wt-%, preferably about 0.01 wt-% to about 20 wt-%, more preferably from about 0.1 wt-% to about 10 wt-% and most preferably from about 0.1 wt-% to about 2 wt-%. The corrosion inhibitor composition includes an effective amount of the corrosion inhibitor package in order to provide a use solution inhibiting corrosion and/or discoloration of metal surfaces contacted with hypochlorite sources. The phrase "effective amount" in reference to the corrosion inhibitors refers to an amount sufficient to provide a use corrosion inhibitor composition that inhibits surface corrosion compared with a composition that is identical except that it does not contain a sufficient amount of the corrosion inhibitor to reduce surface corrosion and/or discoloration after contact with a hypochlorite source. According to a preferred embodiment, the sufficient amount of corrosion inhibitor does not adversely impact the stability of the hypochlorite source.

The corrosion inhibitor composition according to the invention further has a suitable ratio of the particular corrosion inhibitor to calcium compound. According to an embodiment of the invention, a suitable ratio of the particular corrosion inhibitor to a calcium salt for the corrosion inhibitor package is from about 6:1 to about 1:6. Particularly suitable ratios of said corrosion inhibitor to the calcium salt are from about 4:1 to about 1:4. The ratio of the corrosion inhibitor to calcium salt for the corrosion inhibitor package may be controlled to provide reduced corrosion of treated metal surfaces compared with the use of either component alone. According to the invention, the combined use of a corrosion inhibitor and calcium compound, namely water soluble calcium and polymeric salts, can provide a synergy in the reduction of metal corrosion caused by a hypochlorite source.

The corrosion inhibitor composition generally includes a use solution that has a non-acidic pH. The pH suitable for use with the corrosion inhibitor composition may be either neutral or alkaline. As used herein, basic or alkaline pH refers to pH greater than 7, greater than or equal to 8, about 8 to about 9.5, about 8 to about 11, greater than about 9, or about 9 to about 11. According to the invention, a preferred use solution pH to provide a corrosion-inhibited hypochlorite bleach source is from about pH 7 to about pH 11, more preferably from about pH 9 to about pH 11.

Use Compositions

The present corrosion inhibitor composition or a composition containing the corrosion inhibitors can be provided in the form of a concentrate or a use solution. In general, a concentrate refers to a composition that is intended to be diluted with water to provide a use solution that contacts an object to provide the desired corrosion inhibition according to the invention. A use solution may be prepared from the concentrate by diluting the concentrate with water at a dilution ratio that provides a use solution having desired corrosion inhibition properties. In general, the corrosion inhibitor composition that contacts the articles to be protected from hypochlorite corrosion can be referred to as a use composition.

In an exemplary embodiment, a concentrate composition may be diluted at a weight ratio of diluent to concentrate of at least about 1:1 or about 1:1 to about 2000:1.

The use solution of a corrosion inhibitor composition will include at least about 25 parts per million (ppm) of the corrosion inhibitor to provide desired corrosion inhibition properties. Larger amounts of corrosion inhibitor can be used in the use solution without deleterious effects. Embodiments of the use solution of a corrosion inhibitor composition according to the invention can include from about 25 ppm to about 3000 ppm of the corrosion inhibitor, or about 50 ppm to about 2000 ppm of the corrosion inhibitor. The amount of corrosion inhibitor is calculated based upon the combined amount of corrosion inhibitor and calcium compound used according to the invention.

The use solution of a corrosion inhibitor composition according to the invention is preferably applied to a woven or non-woven material (i.e. cleaning wipe), such as a wetted or pre-saturated wipe. In this preferred embodiment, the corrosion inhibitor composition is applied to (i.e. loaded or impregnated onto) the cleaning wipe to a desired ratio. The loading of the cleaning wipe can be accomplished in several ways including, but not limited to, treating each individual wipe with a discrete amount of corrosion inhibitor composition, mass treating a continuous web of cleaning wipes with the corrosion inhibitor composition, soaking the entire web of cleaning wipes in the corrosion inhibitor composition, spraying corrosion inhibitor composition in a stationary or moving web of cleaning wipes, and/or impregnating a stack of individually cut and sized cleaning wipes in a container or a dispenser.

In certain embodiments the wipe soaked in the corrosion inhibitor composition to generate at least about 100 times its weight to ensure proper wetness, preferably at least about 200 times its weight, more preferably at least about 400 times its weight to ensure proper wetness. In still further preferred embodiments, the wipe may be soaked in the corrosion inhibitor composition to generate at least about 800 times its weight to ensure proper wetness.

According to a preferred embodiment, a use solution according to the invention is provided on a wipe for direct application of the sporicidal composition to a surface in need of treatment. In a preferred aspect of the invention, the wipe is wetted or pre-saturated with a use solution of the corrosion inhibitor (i.e. hypochlorite solution, zinc cation and calcium cation) and used for direct application to a surface to provide a sporicidal material having minimal or no corrosion and/or discoloration of the surface.

The woven or non-woven material for use according to the compositions of the invention may include a variety of fabrics, including for example, polyester, polypropylene, polyethylene, cotton, cotton/nylon blends, other textiles, cellulose, polyurethane foams, poly lactic acid, synthetic fibers and/or other fibers as are readily known to one skilled in the art. The material may also include fibrous sheet materials, absorbent and/or non-absorbent materials (including sponges). One skilled in the art will ascertain that the wipes described herein may similarly be described as cleaning wipes, sponges (cellulose, synthetic, etc.), paper towels, napkins, cloths, towels, rags, mop heads and the like.

The materials suitable for use as wipes according to the invention may be manufactured from a variety of woven or non woven processes, including for example, weaving, spun lace, melt blown, thermal bonded, needle punch, stitchbond, carded, and/or other processes known as to one skilled in the art. As one skilled in the art shall appreciate, the materials can be made of various fibers, fabric weights, shapes, perforations, thickness, density and the like. In addition, the wipe materials may also be laminated or otherwise treated with additional materials and/or functional ingredients for various functionalities. In an embodiment, the wipes are produced as a sheet or web which is cut, die-cut or otherwise sized into the desired appropriate shape and size.

In a preferred embodiment of the invention, the non-woven material is polyester. A commercially-available example of a non-woven material suitable for use as a saturated wipe according to the invention is Suominen SX-145 (Suominen Corporation), which is a 100% PET Spun lace nonwoven material (45 g/m² weight).

The use solution of the corrosion inhibitor composition, including for example the use solution that is wetted or pre-saturated into a wipe, includes at least about 25 parts per million (ppm) of the corrosion inhibitor to provide desired corrosion inhibition properties. In particular embodiments at least about 50 ppm corrosion inhibitor are included, at least about 100 ppm, at least about 150 ppm, and more preferably at least about 200 ppm of the corrosion inhibitor are contained in the use solution of the composition saturated into a wipe. According to a particular embodiment the ratio of corrosion inhibitor to a calcium salt for the corrosion inhibitor package is from about 6:1 to about 1:6, preferably about 4:1 to about 1:4. According to a particular embodiment the ratio of hypochlorite source to corrosion inhibitor are from about 10:1 to about 600:1. Beneficially, according to the invention a saturated wipe containing a use solution of the corrosion inhibitor composition requires low levels of the particular corrosion inhibition compound (e.g. zinc compound and calcium compound) in order to achieve the beneficial results of non-corrosive and non-discoloring cleaning efficacy.

According to a preferred embodiment of the invention a wipe housing the corrosion inhibitor composition according to the invention, such as a pre-saturated wipe has between about 10 ppm to about 50,000 ppm disinfectant hypochlorite, preferably between about 100 ppm to about 25,000 ppm and more preferably from about 500 ppm to about 10,000 ppm disinfectant hypochlorite. According to a preferred embodiment the corrosion inhibitor composition has a ratio of corrosion inhibitor to a calcium salt from about 4:1 to about 1:4.

In an aspect of the invention, the composition is substantially-free or free of phosphate. In another aspect of the invention, the composition is substantially-free or free of silicate. In yet another aspect of the invention, the composition is substantially-free or free of aluminum. In a still additional aspect, the composition is substantially-free or free of triazoles compounds.

According to additional embodiments of the invention, the corrosion inhibitor composition can also be used separately from a cleaning wipe as described herein. For instance, the corrosion inhibitor composition can be packaged to be used alone or in combination with other cleaners and/or absorbent or adsorbent materials as one of skill in the art will appreciate.

Additional Agents for Corrosion Inhibitor Compositions

Corrosion inhibitor compositions made according to the invention may further include additional functional agents or additives that provide a beneficial property. For example, additional agents or additives may be selected from the group consisting of pH adjusters or other neutralizing agents, surfactants, emulsifiers, sequestrants, solubilizers, other lubricants, buffers, detergents, cleaning agent, rinse aid composition, secondary anti-corrosion agent, preservatives, binders, thickeners or other viscosity modifiers, processing aids, carriers, water-conditioning agents, foam inhibitors or foam generators, threshold agent or system, aesthetic enhancing agent (i.e., dye, odorant, perfume), other agents or additives suitable for formulation with a corrosion inhibitor composition and the like, and mixtures thereof. Additional agents or additives will vary according to the particular corrosion inhibitor composition being manufactured and its intend use as one skilled in the art will appreciate based on the enabling disclosure of the present invention.

According to an additional embodiment of the invention, the corrosion inhibitor compositions do not contain any of the additional agents. Alternatively, a corrosion inhibitor composition according to the invention only contains hypochlorite-compatible additional agents, for example, surfactants, viscosity modifiers and fragrances. Preferably, the corrosion inhibitor composition does not contain the additional agents commercially-available in common detergent compositions.

Dispensing of the Corrosion Inhibitor Compositions

In a preferred aspect of the invention, a saturated wipe is employed to deliver the corrosion inhibitor compositions. However, the corrosion inhibitor compositions may be dispensed or delivered into a wipe formulation according to a variety of known dispensing methods. In one embodiment, a wipe is soaked in the corrosion inhibitor composition until the wipe is saturated. However, other dispensing means may also initially be employed to deliver the corrosion inhibitor compositions to a wipe application.

The corrosion inhibitor compositions according to the present invention can be dispensed in a variety of suitable methods generally known by one skilled in the art. For example, spray-type dispenser such as that disclosed in U.S. Pat. Nos. 4,826,661, 4,690,305, 4,687,121, 4,426,362 and in U.S. Pat. Nos. Reissue 32,763 and 32,818, the disclosures of which are incorporated by reference herein. A spray-type dispenser functions by impinging a water spray upon an exposed surface of the solid composition to dissolve a portion of the composition, and then immediately directing the concentrate solution including the composition out of the dispenser to a storage reservoir or directly to a point of use. In a further embodiment, the present corrosion inhibitor composition can be dispensed by immersing either intermittently or continuously in water. The composition can then dissolve, for example, at a controlled or predetermined rate. The rate can be effective to maintain a concentration of dissolved cleaning agent that is effective for use according to the methods of the claimed invention. In a still further embodiment, the present corrosion inhibitor composition can be dispensed by scraping solid from the solid composition and contacting the scrapings with water. The scrapings can be added to water to provide a concentration of dissolved corrosion inhibitor that is effective for use according to the methods of the claimed invention.

Kits

The corrosion inhibitor compositions may be further provided in one or more types of kits. In one embodiment of the invention, the composition is a kit comprising, consisting of and/or consisting essentially of a container of wipes with the corrosion inhibitor composition (e.g. hypochlorite solution, zinc compound (or other corrosion inhibitor) and calcium compound) and instructions on their use. In another embodiment of the invention, the composition is a kit comprising, consisting of and/or consisting essentially of a receptacle to hold a multiplicity of wipes, corrosion inhibitor composition and instructions on how to combine for use the wipes and corrosion inhibitor composition. In a further aspect, the kit may further include a dispensing means for providing the corrosion inhibitor composition to the wipes. These and other variations of the kit are included within the scope of the invention.

Methods of Use for Corrosion Inhibitors

The methods for corrosion inhibition according to the invention protect surfaces in contact with hypochlorite sources from corrosion caused by hypochlorite bleach used for a variety of surfaces and antimicrobial, disinfecting and/or sanitizing treatments. Methods for corrosion and/or discoloration inhibition according to the invention may comprise, consist of and/or consist essentially of contacting a surface with a corrosion inhibitor composition, wherein said corrosion inhibitor composition comprises a hypochlorite source and a water soluble polyacrylate and calcium compound. Alternatively the corrosion inhibitor composition may comprise a hypochlorite source and a sugar acid and calcium compound. Still further the corrosion inhibitor composition may comprise a hypochlorite source and a zinc compound and calcium compound. The corrosion inhibitor compositions provide an inhibited hypochlorite solution that can be used as a bleach or surface antimicrobial agent in a variety of applications. One skilled in the art will appreciate and know various application methods.

In an embodiment, the methods of the invention relate to a method employing the corrosion inhibitor composition. The method can include providing the corrosion inhibitor composition to a surface treated with a hypochlorite solution in order to inhibit corrosion and/or discoloration caused by the hypochlorite solution. The method can include preparing an aqueous use composition of the present corrosion inhibitor composition. The method may further include contacting a surface, such as a hard metal surface, in need of corrosion inhibition due to contact with a hypochlorite solution. Alternatively, the methods may include contacting a saturated wipe containing the corrosion inhibitor composition to a surface, such as a hard metal surface, in need of corrosion inhibition due to contact with a hypochlorite solution. The methods employing a saturated wipe containing the corrosion inhibitor composition may additionally include the step of providing a corrosion inhibitor composition to a wipe for formulation (e.g. saturation or loading) thereof. The step of contacting or providing the corrosion inhibitor composition to a surface may include the releasing of the corrosion inhibitor composition from the wipe.

A variety of suitable surfaces may be contacted with the corrosion inhibitor composition according to the invention. Particularly suitable surfaces for treatment with the corrosion inhibitor compositions according to the invention include metallic and metal-containing surfaces, including steel, rolled steel and stainless steel.

Surfaces may be contacted according to the methods of the present invention for use as a hard surface cleaner or sanitizer, including for example, industrial surfaces, food and beverage surfaces, including food processing surfaces, food service and restaurant surfaces, and health care surfaces. According to an embodiment of the invention, it is desirable to use the corrosion inhibitor compositions and the claimed methods of use to inhibit the corrosion of metal surfaces contacted with hypochlorite used as a hard surface sanitizer in janitorial and/or housekeeping applications and food processing equipment and/or plant applications and in laundry applications. For example, the corrosion of washers, such as tunnel washers for washing textiles, may be inhibited according to methods of the claimed invention.

Surfaces particularly well suited for use of the compositions and methods of the invention include those in need of disinfectant treatment, such as hospital and other medical facility markets. Exemplary surfaces commonly found in such settings include, for example, aluminum, stainless steel, nickel and chrome. As sodium hypochlorite has been shown to be beneficial to disinfecting *Clostridium difficile* as well as other organisms it is recommended for use in contaminated areas. (See Guide to the Elimination of *Clostridium Difficile* in Healthcare Settings, 2008, Association for Professionals in Infection Control Epidemiology, Inc.; Guidelines for Environmental Infection Control in Health-Care Facilities, 2003, Centers for Disease Control and the Healthcare Infection Control Practices Advisory Committee). The methods of the invention preferably include the application of a corrosion inhibitor composition to prevent infection, decontaminate a surface and/or eliminate spores without causing corrosion and/or discoloration of the surface.

In particular, health care surfaces are well suited as they often contain metal surfaces that can be easily damaged by contact with sodium hypochlorite. An exemplary surface is a medical instrument with metals in the construction. The present invention of a corrosion inhibitor composition allows for the use of sodium hypochlorite on such hospital and other surfaces where it cannot otherwise be utilized. The methods of applying the corrosion inhibitor composition may include, for example, the use of a spray or a wipe method (e.g. use of a pre-saturated wipe configuration). A wipe method is particularly desirable as a result of concerns of respirator difficulties for those using the compositions containing sodium hypochlorite.

In addition, surfaces may be contacted according to the methods of the present invention for use in low temperature dish and/or ware wash sanitizing final rinse, toilet bowl cleaners, and laundry bleaches. According to further embodiments, the corrosion inhibitor compositions and the claimed methods are used as sanitizers for pools, spas, and hot tubs. According to further embodiments of the invention, the methods are used to treat metal surfaces, such as ware, cleaned and/or sanitized with corrosive hypochlorite sources.

All publications and patent applications in this specification are indicative of the level of ordinary skill in the art to which this invention pertains. All publications and patent applications are herein incorporated by reference to the same extent as if each individual publication or patent application was specifically and individually indicated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

A corrosion test applied hypochlorite solutions to 304 stainless steel coupons for three days at 120° F. The commercially-available concentrated hypochlorite bleach product XY-12 (Ecolab, Inc.), containing 12% sodium hypochlorite and about 12% sodium chloride and a use solution of the bleach product diluted to 100 ppm hypochlorite were applied to the stainless steel coupons. Both hypochlorite solutions caused heavily discolored (dark brown) coupons. In addition, the stainless steel coupons treated with the concentrated bleach/hypochlorite solution showed further corrosion signs of pitting and rust.

Example 2

Comparison of corrosive effects of hypochlorite solutions with corrosion inhibitor compositions. The weight loss of the coupons was determined, with higher weight loss corresponding to loss of metal due to corrosion. The commercially-available concentrated bleach product was modified to contain a non-thickening polyacrylate. The commercially-available polyacrylate Acusol 445N (available from Rohm and Haas) was tested for anti-corrosion efficacy alone, in combination with calcium chloride and compared to calcium chloride alone. Formulations for the various tests are shown in Table 1 below.

TABLE 1

| Corrosion Inhibition Test System | | | | % Wt |
|---|---|---|---|---|
| Component 1 | ppm | Component 2 | ppm | Loss |
| Acusol 445N | 1 | — | — | 0.099 |
| Acusol 445N | 5 | — | — | 0.093 |
| Acusol 445N | 50 | — | — | 0.065 |
| Acusol 445N | 200 | — | — | 0.081 |
| Acusol 445N | 1 | Ca chloride | 50 | 0.055 |
| Acusol 445N | 5 | Ca chloride | 50 | 0.035 |
| Acusol 445N | 50 | Ca chloride | 50 | 0.056 |
| Acusol 445N | 200 | Ca chloride | 50 | 0.043 |
| Ca chloride | 1 | — | — | 0.078 |
| Ca chloride | 5 | — | — | 0.073 |
| Ca chloride | 50 | — | — | 0.073 |
| Ca chloride | 200 | — | — | 0.074 |
| — | — | — | — | 0.070 |

The commercially available hypochlorite solution of Example 1 was diluted to 100 ppm hypochlorite and further modified according to the corrosion inhibition test systems described in Table 1. Non-significant, very slight discoloration of the stainless steel coupon at the air/liquid interact was obtained after three days at 120° F. No pitting and/or rusting corrosion was obtained.

The combination of polyacrylate and calcium chloride showed synergistic reduction in the attack of hypochlorite on stainless steel surfaces. Synergy was determined from the data obtained from designed experiments and an analysis specifically focused on finding synergy. The synergy and rations of ingredients of a corrosion inhibitor package that achieve such synergy are described further herein below. The results were unexpected as a result of the use of the polyacrylate with the hypochlorite solution showing an accelerated attack of hypochlorite on the steel surfaces. In addition, the calcium by itself did not show any efficacy for corrosion inhibition of hypochlorite solutions.

The corrosion inhibition packages according to the invention provide simultaneous control of all corrosive mechanisms of sodium hypochlorite, sodium chloride, and sodium hydroxide (or any combination of the same that may be found in a bleach or hypochlorite source). The corrosion inhibition does not result in any inhibition, inactivation or other modification to the stability of the hypochlorite source, as may be readily measured by one skilled in the art to which the invention pertains.

Example 3

Comparison of corrosive effects of hypochlorite solutions with corrosion inhibitor compositions. The weight loss of the coupons was determined, with higher weight loss corresponding to loss of metal due to corrosion. The commercially-available concentrated bleach product was modified to contain ascorbic acid. The ascorbic acid was tested for anti-corrosion efficacy alone, in combination with calcium chloride and compared to calcium chloride alone. Formulations for the various tests are shown in Table 2 below.

TABLE 2

| Corrosion Inhibition Test System | | | | % Wt |
|---|---|---|---|---|
| Component 1 | ppm | Component 2 | ppm | Loss |
| Ascorbic acid | 1 | — | — | 0.075 |
| Ascorbic acid | 5 | — | — | 0.075 |
| Ascorbic acid | 50 | — | — | 0.081 |
| Ascorbic acid | 200 | — | — | 0.071 |
| Ascorbic acid | 1 | Ca chloride | 50 | 0.061 |
| Ascorbic acid | 5 | Ca chloride | 50 | 0.050 |
| Ascorbic acid | 50 | Ca chloride | 50 | 0.044 |
| Ascorbic acid | 200 | Ca chloride | 50 | 0.046 |
| Ca chloride | 1 | — | — | 0.078 |
| Ca chloride | 5 | — | — | 0.073 |
| Ca chloride | 50 | — | — | 0.073 |
| Ca chloride | 200 | — | — | 0.074 |
| — | — | — | — | 0.070 |

The commercially available hypochlorite solution of Example 1 was diluted to 100 ppm hypochlorite and further modified according to the corrosion inhibition test systems described in Table 1. Non-significant, very slight discoloration of the stainless steel coupon at the air/liquid interact was obtained after three days at 120° F. No pitting and/or rusting corrosion was obtained.

The combination of sugar acid (ascorbic acid) and calcium chloride showed synergistic reduction in the attack of hypochlorite on stainless steel surfaces. Synergy was determined from the data obtained from designed experiments and an analysis specifically focused on finding synergy. The synergy and rations of ingredients of a corrosion inhibitor package that achieve such synergy are described further herein below. The results were unexpected as a result of the use of the ascorbic acid with the hypochlorite solution showed some accelerated attack of hypochlorite on the steel surfaces. In addition, the calcium by itself did not show any efficacy for corrosion inhibition of hypochlorite solutions.

The corrosion inhibition packages according to the invention provide simultaneous control of all corrosive mechanisms of sodium hypochlorite, sodium chloride, and sodium hydroxide (or any combination of the same that may be found in a bleach or hypochlorite source). The corrosion inhibition does not result in any inhibition, inactivation or other modification to the stability of the hypochlorite source, as may be readily measured by one skilled in the art to which the invention pertains.

Example 4

Comparison of corrosive effects of hypochlorite solutions with corrosion inhibitor compositions. The commercially-available concentrated bleach product was diluted to 100 ppm hypochlorite and further modified to contain 1000 ppm of 4:1 parts by weight of zinc chloride to calcium chloride. Non-significant, very slight discoloration of the stainless steel coupon at the air/liquid interact was obtained after three days at 120° F. No pitting and/or rusting corrosion was obtained.

The commercially-available concentrated bleach product was further diluted to 100 ppm hypochlorite and modified to contain 1 ppm of 4:1 parts by weight of zinc chloride to calcium chloride. Again, no sign of discoloration, pitting and/or rusting corrosion was obtained.

Example 5

The effect of zinc to calcium ratio on corrosiveness of bleach concentrate was tested using the experimental conditions set forth in Example 1. The impact of the zinc to calcium ratio on effectiveness as a corrosion inhibitor was tested versus concentration of total corrosion inhibitor used. FIG. 1 shows the change in the weight of the aged stainless steel coupons and the total corrosion inhibitor concentration.

Superior protection from corrosion (as measured based on loss of metal) without the formation of undesirable scale falls closely to the line corresponding to 0% weight change. Effective corrosion inhibition protection for each ratio tested was observed down to about 200 ppm total inhibitor in the 12% hypochlorite solution concentrate regardless of zinc to calcium ratio, demonstrating efficacy at a ratio of total corrosion inhibitor to hypochlorite anion of about 1:600. At 1000 ppm, all ratios of zinc to calcium corrosion inhibitor protected the stainless steel coupons from corrosion by the hypochlorite solution. However, the greatest tendency for scaling was observed with the 1:1 zinc to calcium corrosion inhibitor and the 4:1 zinc to calcium corrosion inhibitor.

Example 6

The effect of pH on corrosion inhibition efficacy of zinc and calcium corrosion inhibitors was tested. Use solutions of concentrated bleach were diluted to 100 ppm hypochlorite was prepared. The pH of the use solutions was adjusted using HCl or NaOH. A corrosion test was then conducted according to the conditions set forth in Example 1.

The graph in FIG. 2 illustrate that areas of effective corrosion inhibitor protection of the stainless steel coupons were achieved at both neutral and alkaline pH ranges regardless of the ratio of zinc to calcium.

Example 7

The synergy between zinc and calcium corrosion inhibitors was tested using the experimental conditions set forth in Example 1. The effect of the levels of zinc and calcium were evaluated and the synergy of the combination of the total corrosion inhibitor package against corrosion by a commercial bleach concentrate are demonstrated in Table 3. In addition, the corrosion inhibition obtained from calcium salts alone, in the absence of zinc salts, was ineffective for hypochlorite solutions.

TABLE 3

| Corrosion Inhibition Test System | | | | % Wt |
|---|---|---|---|---|
| Component 1 | ppm | Component 2 | ppm | Loss |
| Zn chloride | 1 | — | — | 0.089 |
| Zn chloride | 5 | — | — | 0.077 |
| Zn chloride | 50 | — | — | 0.059 |
| Zn chloride | 200 | — | — | 0.027 |
| Zn chloride | 1 | Ca chloride | 50 | 0.061 |
| Zn chloride | 5 | Ca chloride | 50 | 0.055 |
| Zn chloride | 50 | Ca chloride | 50 | 0.019 |
| Zn chloride | 200 | Ca chloride | 50 | 0 |
| 1 | Ca chloride | — | — | 0.078 |
| 5 | Ca chloride | — | — | 0.073 |
| 50 | Ca chloride | — | — | 0.073 |
| 200 | Ca chloride | — | — | 0.074 |
| — | — | — | — | 0.070 |

Example 8

The use of sodium hypochlorite solutions as a disinfectant was analyzed in combination with the corrosion inhibitor compositions according to the invention demonstrating efficacy and applications for use in hospital settings and other medical facility markets. The damaging effects of un-inhibited sodium hypochlorite sources were evaluated for use in contaminated areas compared to compositions according to the invention. The damaging effects of sodium hypochlorite to metal surfaces were evaluated.

A corrosion inhibiting sodium hypochlorite formulas according to embodiments of the invention was utilized (compared to a control of sodium hypochlorite composition without the corrosion inhibiting portion of the compositions). Exemplary disinfectant compositions utilized are set forth in Table 4.

TABLE 4

| Disinfectant Formula Ranges | | |
|---|---|---|
| Sodium Hypochlorite ppm | Zn Salt:Ca Salt Ratio | Corrosion Inhibitor % |
| 500-30,000 ppm | 6:1 to 1:6 | 0.01-2.0% |
| 1,500-15,000 ppm | 6:1 to 1:6 | 0.01-2.0% |
| 4,000-7,000 ppm | 4:1 to 1:4 | 0.02-0.03% |

Evaluated surfaces included the common hospital surfaces of 304 stainless steel, 316 stainless steel, polished nickel and plated chrome.

A pre-saturated wipe was evaluated for delivering the corrosion inhibitor compositions and control compositions. The pre-saturated wipe material was generated by soaking a wipe to generate approximately 400 times its weight to ensure proper wetness. One wipe from each tested variable was then used to wipe each coupon set (e.g. 304 stainless steel, 316 stainless steel, polished nickel and plated chrome). Metal coupons were swept horizontally with the wipe to apply the solution. The entire coupon was covered with the solution and allowed to visibly dry in between applications (approximately 4-5 minutes). The steps were repeated before rinsing the coupons with deionized water and allowed to dry.

The non-corrosion inhibited control formulas demonstrated signs of corrosion and/or discoloration on the tested surfaces, whereas the corrosion inhibiting formulas according to embodiments without resulting corrosion and/or discoloration.

Example 9

The efficacy of corrosion inhibitor and hypochlorite solutions was further evaluated to analyze corrosion and/or discoloration inhibition of treated metal surfaces pursuant to the beneficial results achieved from Example 8. In particular, the use of a corrosion-inhibited hypochlorite cleaning solution known to have efficacy against bacterial spores such as *C. difficile* was evaluated, as such hypochlorite solutions are well known to cause corrosion and discoloration on treated metal surfaces. The corrosion-inhibited clean solutions generated according to the methods of the invention were evaluated for reduced corrosion and/or discoloration of the treated surfaces.

A soak test for evaluation of corrosion on metal was conducted according to the following methods. Samples of corrosion inhibited hypochlorite solutions were prepared. Prior to beginning the tests, the ppm concentrations and pH for each cleaning solution was confirmed. The equal amount of chemistry were placed in sealed jars to completely cover coupons of the applicable metal (i.e. treated surface). Both 304 and 316 stainless steel coupons were employed as exemplary hospital and industrial metal surfaces. Each coupon was weighed and labeled before being placed in the jar with the chemistry to be tested. The jars were placed into chambers at a temperature of 120° F. for 7 days. The coupons were rinsed, dried, weighed, and any visual changes were noted. After each analysis the ppm concentrations and pH of each cleaning solution was re-tested.

The chemistries evaluated are shown in Table 5.

TABLE 5

Hypochlorite Chemistries

| | Hypochlorite | Corrosion Inhibitor |
|---|---|---|
| XY-12 (Ecolab Inc.) | 6500 ppm | NA |
| XY-12 with Corrosion Inhibitor (Ecolab Inc.) | 6500 ppm | 4:1 ratio zinc chloride:calcium chloride |
| Clorox Bleach (The Clorox Company) | 5200 ppm | NA |
| Dispatch Bleach (Caltech Industries) | 6500 ppm | NA |

Figure 3:
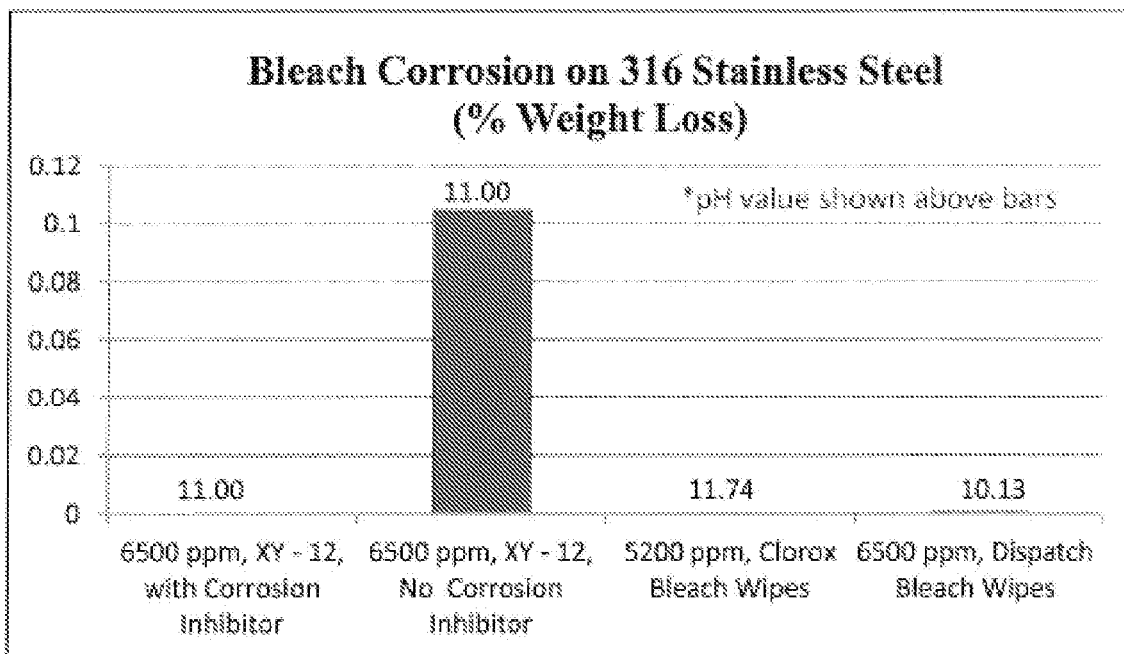
FIG. 3 shows the comparative effects of corrosion-inhibited hypochlorite solutions versus commercial products on bleach corrosion on 316 stainless steel surfaces according to an embodiment of the invention.
Figure 4:
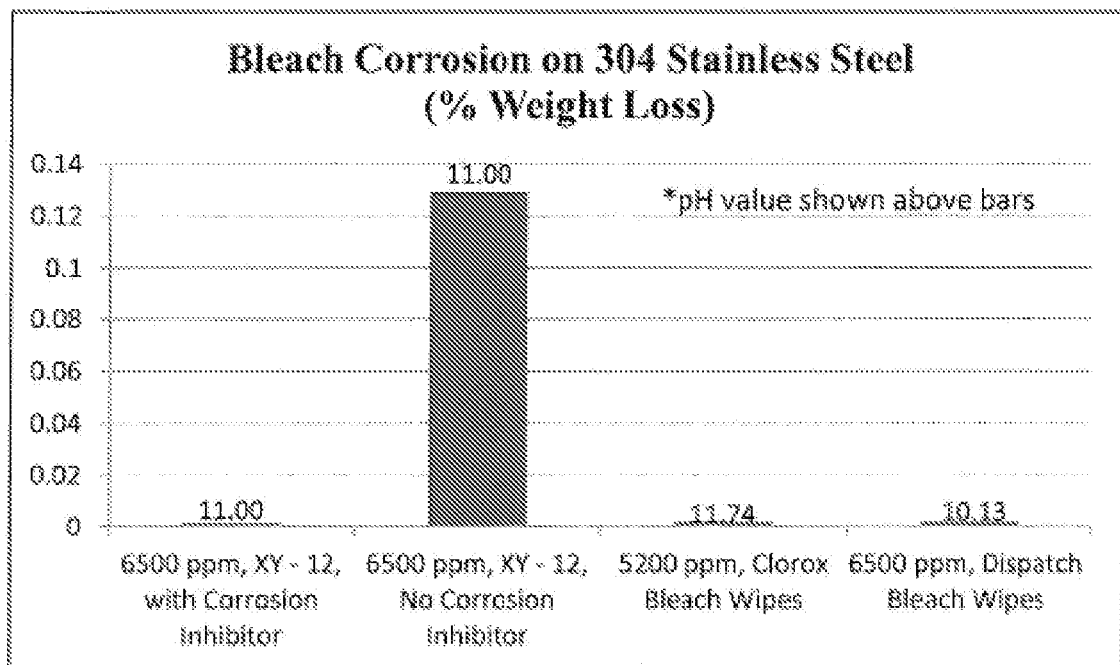
FIG. 4 shows the comparative effects of corrosion-inhibited hypochlorite solutions versus commercial products on bleach corrosion on 304 stainless steel surfaces according to an embodiment of the invention.

Soak Test Results Showing Corrosion Effects. As shown in both FIG. 3 and FIG. 4, regardless of the metal treated, in all cases, the corrosion-inhibited hypochlorite solutions of the present invention resulted in less weight loss of the metal when compared to un-inhibited hypochlorite solution (i.e. XY-12). In addition, the corrosion-inhibited hypochlorite solutions of the present invention performed at least as well or superior to the two commercial hypochlorite products, Clorox Germicidal Wipes and Caltech Dispatch Wipes.

Example 10

Tests to evaluate the discoloration on metals using corrosion-inhibited hypochlorite solutions in comparison to commercial hypochlorite solutions were conducted. In particular, the corrosion-inhibited cleaning solutions according to the present invention were evaluated for reduced discoloration of the treated surfaces according to the following methods.

304 and 316 stainless steel coupons were attached to tiles for easy handling. Four coupons per chemistry were employed to test over extended periods of time (representing applications of use on the treated surface), namely representing 7, 14, 21 and 60 wiping cycle data points (i.e. applying the corrosion-inhibited cleaning solutions in a saturated wipe application). Samples of corrosion inhibited hypochlorite solutions were prepared.

Prior to beginning the tests, the ppm concentrations and pH for each cleaning solution was confirmed. The equal amount of chemistry were placed in sealed jars to completely cover coupons of the applicable metal (i.e. treated surface). Nonwoven log rolls made of Suominen SX-145 were placed into canisters and 400% chemistry was added/loaded into each log roll. The wipes containing the steel coupons were wiped using the chemistries at the defined cycle amounts at room temperature. The coupons were rinsed after each test with deionized water and a paper towel was used to ensure residues were completely removed. The coupons were dried. After each cycle (7, 14, 21 or 60) observations for detecting discoloration were made.

As shown in Table 6, the hypochlorite solution XY-12 (whether a corrosion inhibitor was included or not) outperformed both commercial products.

TABLE 6

Hypochlorite Chemistries Variables

| Chemistry | Corrosion Inhibitor | Hypochlorite (ppm NaOCl) | pH | Discoloration Point 304 SS | 316 SS |
|---|---|---|---|---|---|
| XY-12 | Yes | 800 | 7 | None | None |
| XY-12 | Yes | 6500 | 7 | None | None |
| XY-12 | Yes | 800 | 11 | None | None |
| XY-12 | Yes | 6500 | 11 | None | None |
| XY-12 | No | 6500 | 7 | None | None |
| XY-12 | No | 6500 | 11 | None | None |
| Clorox Bleach Wipes | No | 5200 | 11.74 | 7 Cycles | 7 Cycles |
| Dispatch Bleach Wipes | No | 6500 | 10.13 | 7 Cycles | 7 Cycles |

Example 11

The results from Examples 9 and 10 were combined for further correlation of the combined corrosion and discoloration testing results at a pH range of about 10 to about 12, with 5200-6500 ppm sodium hypochlorite.

Figure 5:
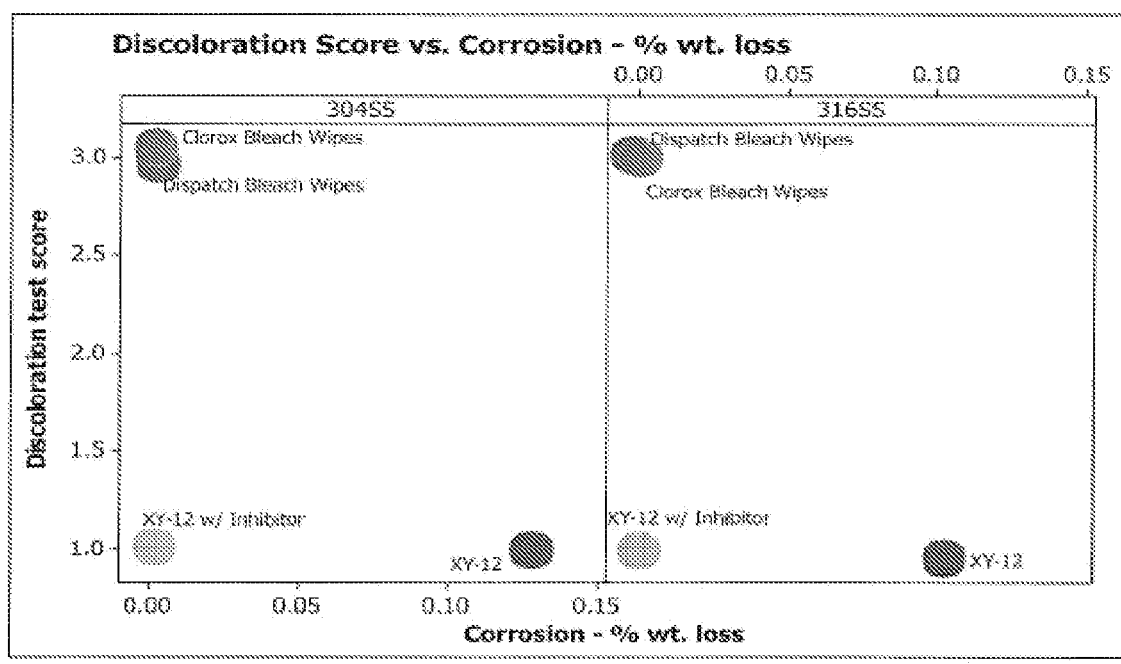
FIG. 5 shows correlation of the bleach corrosion data of Example 9 and the discoloration data of Example 10 demonstrating the efficacy of the corrosion-inhibited hypochlorite solutions of the invention.

As shown in FIG. 5, correlation of the data shows that the hypochlorite solutions of the invention, including the corrosion-inhibited cleaning solutions outperformed commercial products (reflected at bottom of Figure; data points in the lower left hand region of the graph have least amount of discoloration or corrosion). Notably, no discoloration was found on the improved hypochlorite solutions of the invention after 60 cleaning cycles, whereas the commercial products resulted in discoloration at 7 cycles.

The inventions being thus described, it will be obvious that the same may be varied in many ways. Such variations are not to be regarded as a departure from the spirit and scope of the inventions and all such modifications are intended to be included within the scope of the following claims.

What is claimed is:

1. A method for cleaning, sanitizing and/or disinfecting a surface contacted by a hypochlorite source comprising:
    providing a liquid corrosion inhibitor composition in a saturated wipe, wherein the liquid corrosion inhibitor composition comprises a hypochlorite source and a corrosion inhibitor comprising a water soluble calcium salt and a member selected from the group consisting of a water soluble zinc salt, a non-thickening polymeric salt having a molecular weight less than about 10,000, and a sugar acid, and wherein the wipe is a woven or non-woven material, wherein the pH of said composition is at least about 7, the ratio of said hypochlorite source to corrosion inhibitor is from about 10:1 to about 600:1 and the ratio of said zinc salt, polymeric salt or sugar acid to said calcium salt is from about 6:1 to about 1:6; and
    contacting said corrosion inhibitor composition with a surface in need of cleaning, sanitizing and/or disinfecting, wherein said composition inhibits the corrosion and/or discoloration of said surface in the presence of said hypochlorite source.

2. The method according to claim 1, wherein said corrosion inhibitor concentration in said saturated wipe is from about 25 ppm to about 3000 ppm, and wherein said hypochlorite source concentration in said saturated wipe is from about 500 ppm to about 30,000 ppm.

3. The method according to claim 1, wherein said corrosion inhibitor simultaneously controls corrosive mechanisms of sodium hypochlorite, sodium chloride, and sodium hydroxide of said hypochlorite source and prevents discoloration of the surface, wherein said hypochlorite source is free of carbonate and bicarbonate anions, and wherein said corrosion inhibitor is free of bromide, iodide, aluminum and magnesium.

4. The method according to claim 1, wherein said surface is metal, and wherein said surface loses less than about 0.1% of its weight in the presence of said corrosion inhibitor composition.

5. The method of claim 1, further comprising forming a corrosion-inhibiting layer on said surface.

6. A corrosion inhibitor article comprising:
    a woven or non-woven material forming a wipe saturated with a liquid corrosion inhibitor composition; wherein said
    liquid corrosion inhibitor composition comprises a hypochlorite source and a corrosion inhibitor comprising a water soluble calcium compound and a member selected from the group consisting of a zinc compound, a polyacrylate compound, and a sugar acid, wherein the pH of said composition is at least about 7 and wherein the composition does not cause corrosion and/or discoloration on a treated metal surface.

7. The article according to claim 6, wherein said hypochlorite source includes sodium hypochlorite and at least one of sodium chloride and sodium hydroxide, wherein said hypochlorite source is free of carbonate and bicarbonate anions.

8. The article according to claim 6, wherein the ratio of said hypochlorite source to corrosion inhibitor is from about 10:1 to about 600:1.

9. The article according to claim 6, wherein said corrosion inhibitor is an EPA approved inert material for antimicrobial formulations and does not adversely impact the stability of the hypochlorite source.

10. The article according to claim 6, wherein said corrosion inhibitor is a water soluble zinc salt and a water soluble calcium salt, wherein said salts have a chloride or non-halide anion and are not effective as oxidizing agents or reducing agents.

11. The article according to claim 10, wherein the zinc salt includes zinc chloride and/or zinc sulfate and the ratio of said zinc salt to said calcium salt is from about 4:1 to about 1:4.

12. The article according to claim 6, wherein said corrosion inhibitor is a water soluble, non-thickening polymeric salt having molecular weight less than about 7,000 and a water soluble calcium salt, wherein said salts have a chloride or non-halide anion.

13. The article according to claim 12, wherein said polymeric salt is sodium polyacrylate or sodium methacrylate and said calcium salt is calcium chloride or calcium sulfate.

14. The article according to claim 6, wherein said corrosion inhibitor is a sugar acid and a water soluble calcium salt, wherein said salts have a chloride or non-halide anion, and wherein the ratio of said sugar acid to said calcium salt is from about 4:1 to about 1:4.

15. The article according to claim 6, wherein the liquid corrosion inhibitor composition is free of phosphate, silicate, aluminum and triazole compounds.

16. A corrosion inhibitor article comprising:
    a woven or non-woven material forming a wipe saturated with a corrosion inhibitor composition; wherein said
    corrosion inhibitor composition comprises a hypochlorite source comprising sodium hypochlorite, sodium chloride and sodium hydroxide, and about 0.01 to about 2 wt-% corrosion inhibitor comprising a water soluble calcium salt and a member selected from the group consisting of a water soluble zinc salt, a non-thickening polymeric salt having a molecular weight less than about 10,000, and a sugar acid;
    wherein the pH of said composition is at least about 7, the ratio of said hypochlorite source to corrosion inhibitor is from about 10:1 to about 600:1 and the ratio of said zinc salt, polymeric salt or sugar acid to said calcium salt is from about 6:1 to about 1:6, and wherein the composition does not cause corrosion and/or discoloration on a treated metal surface.

17. The article according to claim 16, wherein said corrosion inhibitor composition has a pH of at least 9.

18. The article according to claim 16, wherein the ratio of said zinc salt, polymeric salt or sugar acid to said calcium salt is from about 4:1 to about 1:4.

19. The article according to claim 16, wherein the ratio of said hypochlorite source to corrosion in is from about 50:1 to about 200:1.

20. The article according to claim 16, wherein said corrosion inhibitor is an EPA approved inert material for antimicrobial formulations and does not adversely impact the stability of the hypochlorite source.

21. The article according to claim 16, wherein said corrosion inhibitor is a water soluble zinc salt and a water soluble calcium salt, wherein said salts have a chloride or non-halide anion.

22. A kit comprising:
    a container containing the article of claim 6; and
    instructions for use.

23. A kit comprising:

a container containing a woven or non-woven material forming a wipe saturated with a liquid corrosion inhibitor composition; wherein said corrosion inhibitor composition comprises a hypochlorite source and a corrosion inhibitor comprising a water soluble calcium compound and a member selected from the group consisting of a zinc compound, a polyacrylate compound, and a sugar acid, wherein the pH of said composition is at least about 7 and wherein the composition does not cause corrosion and/or discoloration on a treated metal surface; and instructions for use to combine and use the wipes with the corrosion inhibitor composition.

\* \* \* \* \*

UNITED STATES PATENT AND TRADEMARK OFFICE
CERTIFICATE OF CORRECTION

| | | |
|---|---|---|
| PATENT NO. | : 8,557,178 B2 | Page 1 of 1 |
| APPLICATION NO. | : 13/548367 | |
| DATED | : October 15, 2013 | |
| INVENTOR(S) | : Erik C. Olson | |

It is certified that error appears in the above-identified patent and that said Letters Patent is hereby corrected as shown below:

In the Claims:

Col. 26, Claim 13, Line 22:
DELETE before or "poly acrylate"
ADD before or --polyacrylate--

Col. 26, Claim 19, Line 56:
DELETE after corrosion "in"
ADD after corrosion --inhibitor--

Signed and Sealed this
Twenty-eighth Day of January, 2014

Michelle K. Lee
*Deputy Director of the United States Patent and Trademark Office*